(12) United States Patent
Zhou et al.

(10) Patent No.: US 12,194,604 B2
(45) Date of Patent: Jan. 14, 2025

(54) DISMANTLING DEVICE

(71) Applicants: FU DING ELECTRONICAL TECHNOLOGY (JIASHAN) CO.,LTD., Jiashan (CN); FUZHUN PRECISION TOOLING (JIASHAN) CO., LTD., Jiaxing (CN)

(72) Inventors: Yi Zhou, Jiashan (CN); Xiong-Jun Shu, Jiashan (CN); Yue Li, Jiashan (CN); Dao-Cheng Wang, Jiashan (CN); Ya-Jie Gao, Jiashan (CN); Ping Jiang, Jiashan (CN); Liang-En Zhu, Jiashan (CN)

(73) Assignees: FU DING ELECTRONICAL TECHNOLOGY (JIASHAN) CO., LTD., Jiashan (CN); FUZHUN PRECISION TOOLING (JIASHAN) CO., LTD., Jiaxing (CN)

( * ) Notice: Subject to any disclaimer, the term of this patent is extended or adjusted under 35 U.S.C. 154(b) by 260 days.

(21) Appl. No.: 18/010,781

(22) PCT Filed: Sep. 30, 2020

(86) PCT No.: PCT/CN2020/119515
§ 371 (c)(1),
(2) Date: Dec. 15, 2022

(87) PCT Pub. No.: WO2022/067710
PCT Pub. Date: Apr. 7, 2022

(65) Prior Publication Data
US 2023/0234196 A1    Jul. 27, 2023

(51) Int. Cl.
*B23P 19/00* (2006.01)
*B25B 27/04* (2006.01)
*B25B 27/14* (2006.01)

(52) U.S. Cl.
CPC .............. *B25B 27/04* (2013.01); *B25B 27/14* (2013.01)

(58) Field of Classification Search
CPC ......... B25B 27/00; B25B 27/04; B25B 27/14; B23P 19/00; B23P 19/04; B23P 19/02; B23P 19/10
See application file for complete search history.

(56) References Cited

U.S. PATENT DOCUMENTS 3,700,228 A * 10/1972 Peale .................. B23Q 1/5437
269/57
7,066,100 B2 * 6/2006 Katayama .............. B23Q 3/183
269/55
(Continued)

FOREIGN PATENT DOCUMENTS

CN          201597018 U     10/2010
CN          105500283 A      4/2016
(Continued)

*Primary Examiner* — Lee D Wilson
(74) *Attorney, Agent, or Firm* — ScienBiziP, P.C.

(57) ABSTRACT

A dismantling device, comprising a base, a bearing mechanism, a moving mechanism and a pulling-out assembly, the bearing mechanism supports a product to be dismantled; the pulling-out assembly comprises a connecting mechanism, a drive mechanism, a catching member and a sliding block; the connecting mechanism comprises an outer framework and an inner framework sliding relative to the outer framework; the outer framework is connected to the moving mechanism and presses against the product; the drive mechanism is connected to the inner framework and the sliding block; the catching member is slidably arranged in the inner framework; the sliding block slides with the catching member; and the drive mechanism drives the catching member to clamps the part and the inner framework dismantles the part from the product.

17 Claims, 9 Drawing Sheets

(56) References Cited

U.S. PATENT DOCUMENTS

| | | | | |
|---|---|---|---|---|
| 8,132,802 | B2* | 3/2012 | Kolodge | G01B 11/245 |
| | | | | 356/639 |
| 8,403,728 | B2* | 3/2013 | Chen | B23Q 39/024 |
| | | | | 451/151 |
| 8,784,155 | B2* | 7/2014 | Guo | B23Q 1/626 |
| | | | | 451/5 |
| 11,579,568 | B2* | 2/2023 | Cretenet | G04D 1/06 |
| 2012/0168999 | A1* | 7/2012 | Zheng | B23Q 5/40 |
| | | | | 269/60 |
| 2018/0154489 | A1* | 6/2018 | Tada | F16C 32/0659 |
| 2023/0234196 | A1* | 7/2023 | Zhou | B23P 19/06 |
| | | | | 29/244 |

FOREIGN PATENT DOCUMENTS

| | | |
|---|---|---|
| CN | 107127710 A | 9/2017 |
| CN | 209036421 U | 6/2019 |
| DE | 102016003046 A1 | 9/2017 |

\* cited by examiner

DISMANTLING DEVICE

TECHNICAL FIELD

The present disclosure relates to a part dismantling technology field, in particular to a dismantling device.

BACKGROUND

In electronic products, such as notebook computers, etc., a housing may be connected through an interference fit of screws and bolts, defective screws need to be removed. Due to limitations such as shapes and sizes of the screws, a manual removal of the defective screws may be needed. Such removal processes are time consuming and labor intensive, resulting low efficiency and low yield. Furthermore, improper removal due to human errors may cause damages to the products.

SUMMARY OF THE INVENTION

On that account, a dismantling device is provided for solving the above said problems.

The present disclosure is to provide a dismantling device configured to dismantle parts from an item, the dismantling device includes a base, a bearing mechanism, a moving mechanism, and a pulling-out assembly; the bearing mechanism is arranged on the base and configured to support the item to be dismantled; the moving mechanism is arranged on the base, the moving mechanism is movable in a first direction and a second direction; the pulling-out assembly includes a connecting mechanism, a drive mechanism, a catching member, and a sliding block; the connecting mechanism includes an outer framework and an inner framework, the outer and the inner frameworks are slidable relative to each other, the outer framework is connected to the moving mechanism, the moving mechanism drives the outer framework to press against the item to be dismantled, the inner framework defines a receiving space; the drive mechanism is connected to the inner framework; the catching member slidably is arranged in the receiving space; the sliding block is connected to the drive mechanism and slidably engaged with the catching member, the drive mechanism drives the inner framework to slide relative to the outer framework until the catching member encloses the parts of the item to be dismantled, the drive mechanism drives the sliding block to move to a position where the catching member is positioned to catch the parts, and the driving mechanism drives the inner framework to move further to dismantle the parts from the item.

According to an embodiment of the present disclosure, the outer framework comprises a pressing frame and a securing frame connected to the pressing frame, the pressing frame is connected to the moving mechanism, the drive mechanism is fixed on the securing frame.

According to an embodiment of the present disclosure, the inner framework comprises a first supporting frame and a second supporting frame, the first supporting frame is connected to the drive mechanism, the pressing frame is slidably connected to the second supporting frame, the drive mechanism is configured to drive the first supporting frame and the second supporting frame to slide relative to the securing frame and the pressing frame.

According to an embodiment of the present disclosure, the pressing frame comprises supporting boards and a pressing board connected to an end of each of the supporting boards, each of the supporting boards defines a groove, the groove is configured to be slidably connected to the second supporting frame, the pressing board defines a hole, the pressing board is configured to press against the item and expose the parts from the hole.

According to an embodiment of the present disclosure, the second supporting frame comprises two catching boards corresponding to each other, the two catching boards enclose to cooperatively form the receiving space, an inner side of each of the catching boards comprises a sliding bar, the sliding bar is slidably connected to the catching member, an outer side of each of the catching boards comprises a guiding block, the guiding block is slidably arranged in the groove of one of the supporting board.

According to an embodiment of the present disclosure, the catching member comprises two catching blocks corresponding to each other, opposite sides of each of the of the catching blocks define sliding grooves, the catching blocks are slidably arranged on the catching boards by slidably engaging the sliding bars of the catching boards with a respective one of the sliding grooves.

According to an embodiment of the present disclosure, each of the catching blocks comprises elastic pieces or magnetic pieces, the elastic pieces are connected between the second supporting frame and the catching blocks, the magnetic pieces are arranged in the catching blocks, the catching blocks resisting each other by a force of the elastic pieces or the magnetic pieces.

According to an embodiment of the present disclosure, one end of each of the catching blocks comprises a bevel, the end having the bevel of each of the catching blocks is corresponding to each other, two ends of the sliding block include bevels inclined to each other, slidably engaged with the ends of the catching blocks having the bevel, thereby the sliding block pushes the catching blocks to move forward or backward relative to each other.

According to an embodiment of the present disclosure, each of the catching blocks defines a sliding groove and a catching groove communicated with the sliding groove, the sliding groove is defined on the bevel of the catching blocks, as the sliding block pushes the catching blocks to move forward or backward relative to each other on the catching boards, the catching grooves of the catching blocks are moved closer or away from each other.

According to an embodiment of the present disclosure, two ends of the sliding block comprise sliding bars, an end of the sliding block pushing the catching blocks is an inverted square frustum shaped structure, the sliding bars are arranged on two sides of the inverted square frustum shaped structure for slidably engaging with the sliding grooves.

According to an embodiment of the present disclosure, the drive mechanism comprises a first drive module and a second drive module, the first drive module is connected to the securing frame and the first supporting frame, the first drive module is configured to drive the first supporting frame and the second supporting frame to rise and fall relative to the securing frame; the second drive module is arranged on the second supporting frame and connected to the sliding block, the second drive module is configured to drive the sliding block to rise and fall relative to the catching blocks, thereby moving the catching blocks become closes or away from each other.

On another hand of the present disclosure, a dismantling device is configured to dismantle parts from an item, the dismantling device includes a body, a moving mechanism, and a pulling-out assembly, the body supports the item to be dismantled; the moving mechanism is arranged on the body, the moving mechanism is configured to drive the pulling-out assembly to move to the item to be dismantled; the pulling-out assembly includes a connecting mechanism, a drive mechanism, a catching member, and a sliding block; the connecting mechanism is connected to the moving mechanism, the moving mechanism is configured to drive the connecting mechanism to press against the item to be dismantled; the drive mechanism includes a first drive module and a second drive module; the catching member is slidably arranged on the connecting mechanism; the sliding block is connected to the second drive module and slidably engaged with the catching member, the second drive module is configured to drive the sliding block to move relative to the catching member, the catching member selectively catches the parts of the item, the first drive module is configured to drive the connecting mechanism, the catching member moves backwardly to dismantle the parts from the item.

According to an embodiment of the present disclosure, the connecting mechanism comprises an outer framework and an inner framework, the outer and the inner frameworks are slidable relative to each other, the moving mechanism drives the outer framework to press against the item to be dismantled, the inner framework defines a receiving space, the catching member is slidably arranged in the receiving space.

According to an embodiment of the present disclosure, the pressing frame comprises supporting boards and a pressing board connected to an end of each of the supporting boards, each of the supporting boards defines a groove, the groove is configured to be slidably connected to the second supporting frame, the pressing board defines a hole, the pressing board is configured to press against the item and expose the parts from the hole.

According to an embodiment of the present disclosure, the inner framework comprises a first supporting frame and a second supporting frame, the first supporting frame is connected to the drive mechanism, the pressing frame is slidably connected to the second supporting frame, the drive mechanism is configured to drive the first supporting frame and the second supporting frame to slide relative to the securing frame and the pressing frame.

According to an embodiment of the present disclosure, the second supporting frame comprises two catching boards corresponding to each other, the two catching boards enclose to cooperatively form the receiving space, an inner side of each of the catching boards comprises a sliding bar, the sliding bar is slidably connected to the catching member, an outer side of each of the catching boards comprises a guiding block, the guiding block is slidably arranged in the groove of one of the supporting board.

According to an embodiment of the present disclosure, the catching member comprise catching blocks corresponding to each other, one end of each of the catching blocks comprises a bevel, the end having the bevel of each of the catching blocks is corresponding to each other, opposite ends of the sliding block include bevels inclined to each other, slidably engaged with the ends of the catching blocks having the bevel, for allowing the sliding block to push the catching blocks to forwardly to or backwardly from each other.

According to an embodiment of the present disclosure, each of the catching blocks defines a sliding groove and a catching groove communicated with the sliding groove, the sliding groove is defined on the bevel of the catching blocks, as the sliding block pushes the catching blocks to move forward or backward relative to each other on the catching boards, the catching grooves of the catching blocks are moved closer or away from each other.

According to an embodiment of the present disclosure, two ends of the sliding block comprise sliding bars, an end of the sliding block pushing the catching blocks is an inverted square frustum shaped structure, the sliding bars are arranged on two sides of the inverted square frustum shaped structure for slidably engaging with the sliding grooves.

According to an embodiment of the present disclosure, the drive mechanism comprises a first drive module and a second drive module, the first drive module is connected to the securing frame and the first supporting frame, the first drive module is configured to drive the first supporting frame and the second supporting frame to rise and fall relative to the securing frame; the second drive module is arranged on the second supporting frame and connected to the sliding block, the second drive module is configured to drive the sliding block to rise and fall relative to the catching blocks, thereby moving the catching blocks become closes or away from each other.

The dismantling device locates the part to be dismantled through the scanning mechanism, the controller controls the bearing mechanism, the moving mechanism, and the pulling-out assembly to move cooperatively to dismantle the parts from the item, no human operations are needed, which is high efficiency, the catching openings with wedge-shaped may conveniently catch the part, which may improve a dismantling yield, decrease damages of the items, and save manufacture cost.

MAIN ELEMENTS SYMBOLS DESCRIPTION

Item 200
Screw 201
Bolt 202
Dismantling device 100
Base 10
Receiving box 11
Bearing mechanism 20

Sliding rail 21
Limiting block 211, 316
Bearing board 22
Supporting block 221
Positioning block 222
Depression area 223
Drive member 23
Electric motor 231, 313, 324, 4211, 4221
Guide screw 232, 314, 322, 4212, 4222
Sliding block 233, 315, 323, 4223
Moving mechanism 30
First moving mechanism 31
Rack 311
Fixed board 3111
Guiding rail 312
Second moving mechanism 32
Connecting rack 321
Connecting board 325
Mounting rack 3251
Pulling-out assembly 40
Connecting mechanism 41
Outer framework 410
Pressing frame 411
Supporting board 4111
Groove 4111a
Pressing board 4112
Hole 4112a
Inner framework 434
First supporting frame 413
Sliding cover board 4131
Second supporting frame 414
Holding board 4141
Mounting board 4142
Catching board 4143
Sliding bar 4143a
Guiding block 4143b
Receiving space 4143c
Drive mechanism 42
First drive module 421
Limiting portion 4213
Second drive module 422
Catching member 43
Catching block 431
Sliding groove 4311
Catching groove 4312
Catching opening 4312a
Sliding groove 4313
Sliding block 44
Pressing portion 441
Sliding bar 4411
Connecting portion 442
Scanning mechanism 50
Engine base 60
Protection cover 70
Human-computer interface 71
Operation buttons 72

The present disclosure is described combining embodiments and the figures as follows.

DETAILED DESCRIPTION

The following description is used to disclose the present disclosure so that those skilled in the art can implement the present disclosure. The preferred embodiments in the following description are only examples, and those skilled in the art can think of other obvious variations. The basic principles of the present disclosure defined in the following description can be applied to other embodiments, modifications, improvements, equivalents, and other technical solutions that do not depart from the spirit and scope of the present disclosure.

Those skilled in the art should understand that, in the disclosure of the present disclosure, the terms "longitudinal", "lateral", "upper", "lower", "front", "rear", "left", "right", the orientation or positional relationship indicated by "vertical", "horizontal", "top", "bottom", "inner", "outer", etc. are based on the orientation or positional relationship shown in the drawings, which is only for the convenience of describing the present disclosure and to simplify the description, rather than indicating or implying that the device or element referred to must have a specific orientation, or be constructed and operated in a specific orientation, so the above terms should not be understood as limiting the present disclosure.

It can be understood that the term "a" should be understood as "at least one" or "one or more", that is, in one embodiment, the number of an element may be one, and in another embodiment, the number of the elements can be more than one, and the term "one" cannot be taken as a restriction on the number.

The present disclosure is to provide a dismantling device configured to dismantle parts from an item or a product, the dismantling device includes a base, a bearing mechanism, a moving mechanism, and a pulling-out assembly; the bearing mechanism arranged on the base and configured to support the item to be dismantled; the moving mechanism is arranged on the base, the moving mechanism is capable of moving in a first direction and a second direction; the pulling-out assembly includes a connecting mechanism, a drive mechanism, a catching member, and a sliding block; the connecting mechanism includes an outer framework and an inner framework capable of sliding relative to the outer framework, the outer framework is connected to the moving mechanism, the outer framework is capable of being driven by the moving mechanism to press against the item to be dismantled, the inner framework defines a receiving space; the drive mechanism is connected to the inner framework; the catching member slidably is arranged in the receiving space; the sliding block is connected to the drive mechanism and slidably engaged with the catching member, the drive mechanism is capable of driving the inner framework to slide relative to the outer framework, until the catching member encloses the part to be dismantled, the drive mechanism is further capable of driving the sliding block to move, to let the catching member catching the part, and driving the inner framework to move, to dismantle the part from the item.

On another hand of the present disclosure, a dismantling device is configured to dismantle parts from an item, the dismantling device includes a body, a moving mechanism, and a pulling-out assembly, the body supports the item to be dismantled; the moving mechanism is arranged on the body, the moving mechanism is configured to drive the pulling-out assembly to move to the item to be dismantled; the pulling-out assembly includes a connecting mechanism, a drive mechanism, a catching member, and a sliding block; the connecting mechanism is connected to the moving mechanism, the moving mechanism is configured to drive the connecting mechanism to press against the item to be dismantled; the drive mechanism includes a first drive module and a second drive module; the catching member is slidably arranged on the connecting mechanism; the sliding block is connected to the second drive module and slidably engaged with the catching member, the second drive module is configured to drive the sliding block to move relative to the catching member, the catching member is capable of selectively catching the part, the first drive module is configured to drive the connecting mechanism, the catching member moves backwardly to dismantle the part from the item.

The dismantling device locates the part to be dismantled through the scanning mechanism, the controller controls the bearing mechanism, the moving mechanism, and the pulling-out assembly to move cooperatively to dismantle the parts from the item, no human operations are needed, which is high efficiency, the catching openings with wedge-shaped may conveniently catch the part, which may improve a dismantling yield, decrease damages of the items, and save manufacture cost.

At least one embodiment of the present disclosure is described hereinafter together with figures.

Figure 1:
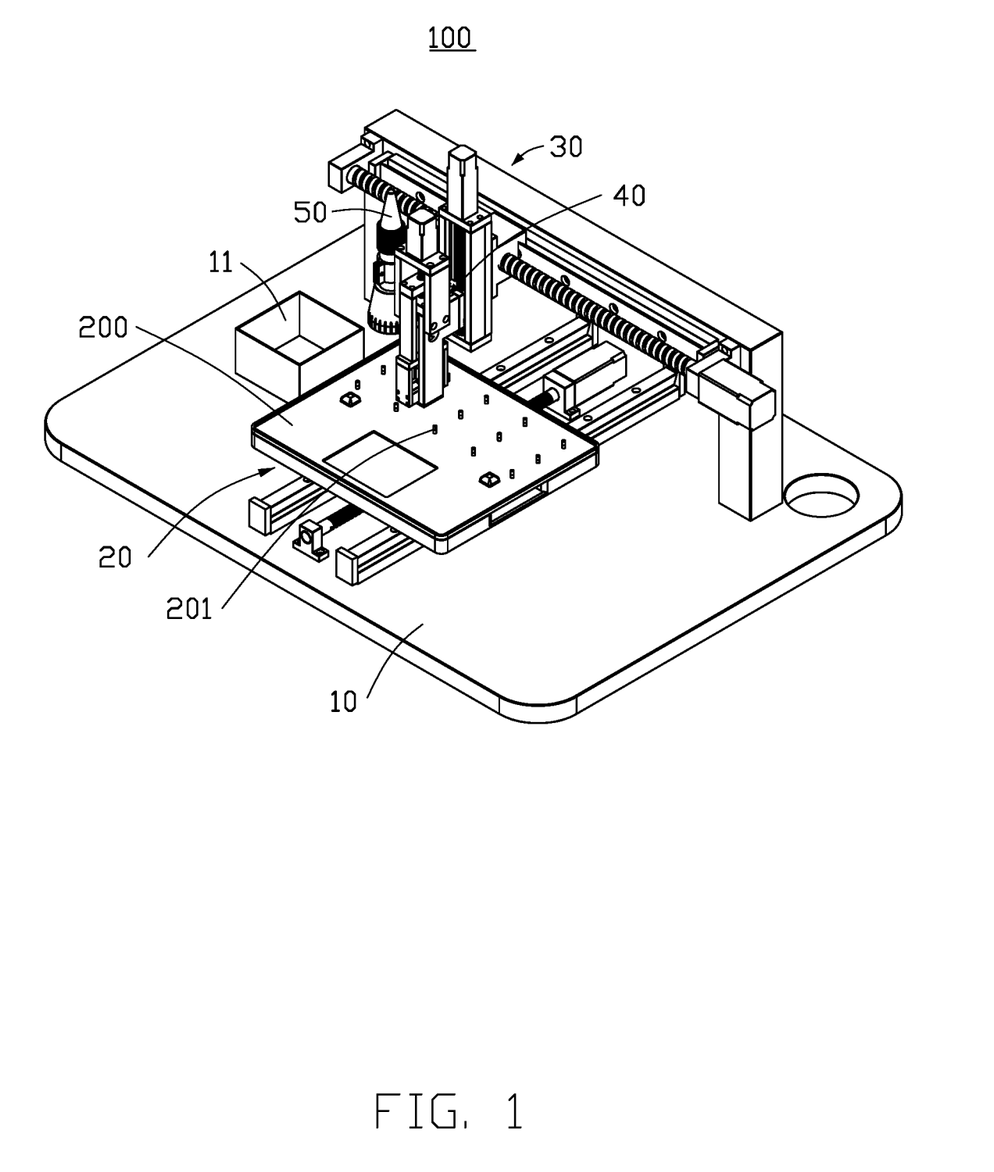
FIG. 1 is a structural schematic diagram of a dismantling device according to an embodiment of the present disclosure.

Referring to FIG. 1, a dismantling device 100 is configured to dismantle parts from an item 200, such as dismantling screws 201 from bolts. The dismantling device 100 includes a base 10, a bearing mechanism 20, a moving mechanism 30, a pulling-out assembly 40, a scanning mechanism 50, and a controller (not shown in the figures). The bearing mechanism 20, the moving mechanism 30, and the pulling-out assembly 40 are arranged on the base 10. The moving mechanism 30 is connected to and configured to drive the pulling-out assembly 40. The scanning mechanism 50 is connected to the pulling-out assembly 40 and configured to locate parts to be dismantled, such as the screws 201. The controller is electrically connected to the bearing mechanism 20, the moving mechanism 30, the pulling-out assembly 40, and the scanning mechanism 50. The controller is configured to control the bearing mechanism 20, the moving mechanism 30, the pulling-out assembly 40 to work cooperatively according to position information of the scanning mechanism 50, so as to dismantle parts, such as the screws 201, from the items on the bearing mechanism 20.

The base 10 is arranged with a receiving box 11, the receiving box 11 is in a moving direction of the moving mechanism 30, the receiving box 11 is configured to receive dismantled parts.

Figure 2:
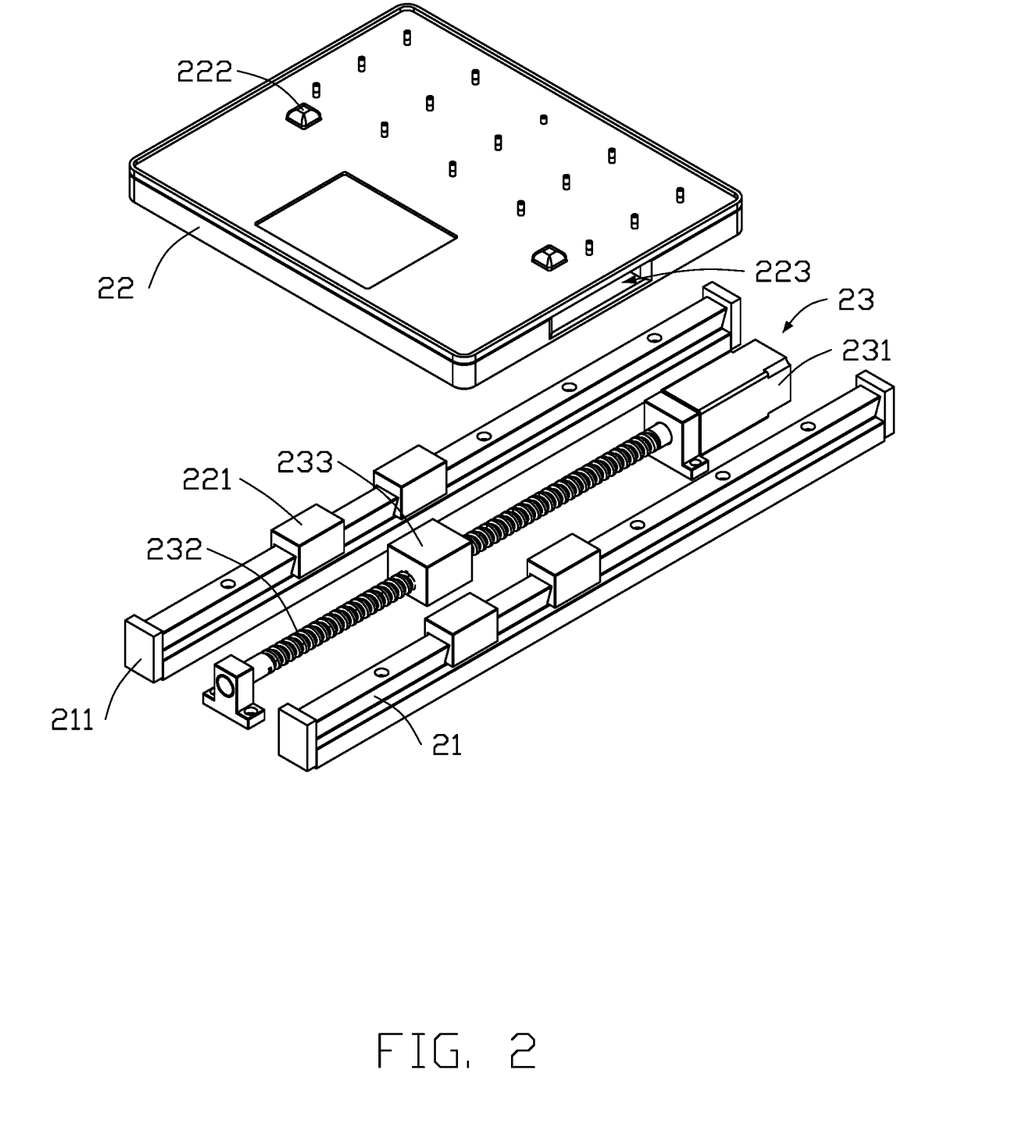
FIG. 2 is a structural schematic diagram of a bearing mechanism according to the embodiment of the present disclosure.

Referring to FIG. 2, the bearing mechanism 20 includes a sliding rail 21, a bearing board 22, and a drive member 23. The sliding rail 21 is arranged on the base 10. The bearing board 22 is slidably connected to the sliding rail 21. The drive member 23 is connected to the bearing board 22 and configured to drive the bearing board 22 to move on the sliding rail 21.

In at least one embodiment, ends of the sliding rail 21 are arranged with limiting blocks 211 for preventing the bearing board 22 sliding off from the sliding rail 21. In at least one embodiment, there are two sliding rails 21 correspondingly and parallelly arranged on the base 10.

Each sliding rail 21 is arranged with several supporting blocks 221, the several supporting blocks 221 are fixedly connected to a side of the bearing board 22 corresponding to the sliding rail 21, to allow the bearing board 22 to slide related to the sliding rails 21. In at least one embodiment, each supporting block 221 defines a dovetail groove, a cross section of the sliding rail 21 perpendicular to a length direction may be an inverted trapezoidal, the dovetail groove is engaged with the sliding rail 21 with the cross section of inverted trapezoidal, for improve a stability of the bearing board 22 sliding on the sliding rails 21. A side of the bearing board 22 opposite to the sliding rails 21 includes several positioning blocks 222 for positioning the item 200. In at least one embodiment, the positioning blocks 222 are arranged on peripheries of the bearing board 22 and configured to latch the item 200 therebetween. In at least one embodiment, the positioning blocks 222 are corresponding to a hollow portion of the item 200 for limiting the position of the item 200 and limiting the movement of the item 200 on the bearing board 22. In another embodiment, the positioning blocks 222 are adjustably arranged on the bearing board 22, such as by magnetic adsorption, positions of the positioning blocks 222 may be adjustable according to a structure of the item 200. In at least one embodiment, a side or opposite sides of the bearing board 22 defines a depression area 223, the depression area 223 is formed by recessing from a bearing surface of the bearing board 22 towards a side of the bearing board 22 corresponding to the sliding rails 21, for the item 200 being easily picked from and placed to the bearing board 22.

The drive member 23 includes an electric motor 231, a guide screw 232, and sliding block 233. The guide screw 232 is connected between the electric motor 231 and the sliding rails 21, the sliding block 233 is slidably arranged on the guide screw 232 and fixed to the bearing board 22, the electric motor 231 rotates the guide screw 232, the sliding block 233 slides on the guide screw 232, so as to drive the bearing board 22 connected to the sliding block 233 to move on the sliding rails 21, and thus to control the position of the item 200.

Figure 3:
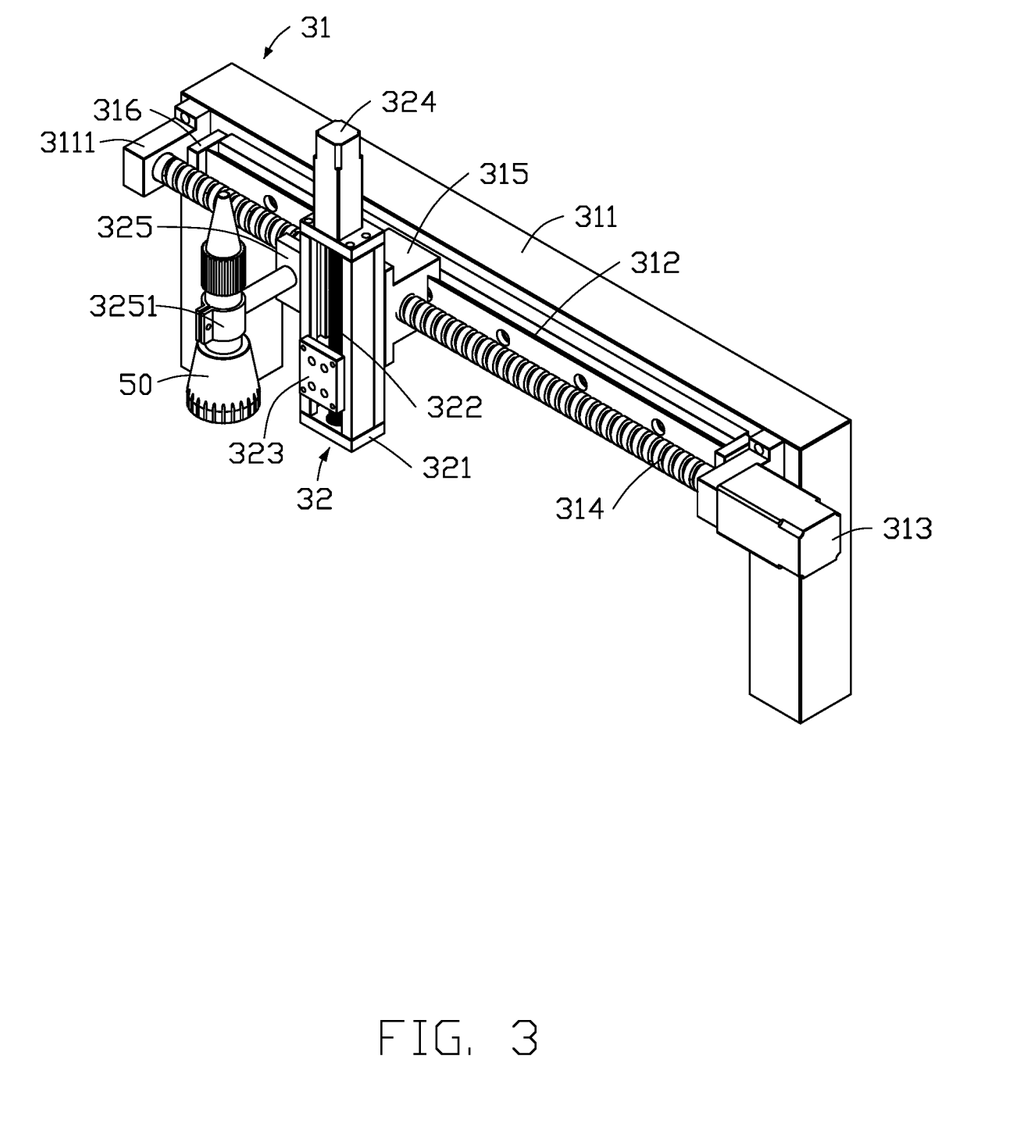
FIG. 3 is a structural schematic diagram of a moving mechanism according to the embodiment of the present disclosure.

The moving mechanism 30 includes a first moving mechanism 31 and a second moving mechanism 32. The first moving mechanism 31 is arranged on the base 10, the second moving mechanism 32 is connected to the first moving mechanism 31.

Referring to FIG. 3, the first moving mechanism 31 includes a rack 311, a guiding rail 312, an electric motor 313, a guide screw 314, and a sliding block 315. Two sides of the rack 311 are arranged with fixed boards 3111, the rack 311 is fixed on the base 10. The guiding rail 312 is fixed on the rack 311, the guide screw 314 is arranged on the fixed boards 3111, the electric motor 313 is fixed on the fixed boards 3111 and connected to the guide screw 314, the sliding block 315 is arranged on the guide screw 314 and slidably connected to the guiding rail 312. The electric motor 313 rotates the guide screw 314, so the sliding block 315 may slide on the guide screw 314 and the guiding rail 312. In at least one embodiment, the guiding rail 312 is substantially parallel with the base 10, the first moving mechanism 31 is configured to drive the second moving mechanism 32 to move along a horizontal direction. In at least one embodiment, two ends of the guiding rail 312 are arranged with limiting blocks 316 for preventing the sliding block 315 sliding off from the guiding rail 312.

The second moving mechanism 32 includes a connecting rack 321, a guide screw 322, a sliding block 323, and an electric motor 324. The connecting rack 321 is fixed on the sliding block 315. One end of the guide screw 322 is connected to the connecting rack 321, another end of the guide screw 322 insert through the connecting rack 321 and connected to the electric motor 324. The electric motor 324 is fixed on the connecting rack 321, the sliding block 323 is arranged on the guide screw 322. The electric motor 324 rotates the guide screw 322, so the sliding block 323 may slide on the guide screw 322. In at least one embodiment, the guide screw 322 is substantially perpendicular to a plane of the base 10, the electric motor 324 is configured to drive the sliding block 323 to move along a vertical direction. In at least one embodiment, the second moving mechanism 32 further includes a connecting board 325, the connecting board 325 is fixed on the connecting rack 321, the connecting board 325 is arranged with a mounting rack 3251 for securing the scanning mechanism 50.

The base 10 and the bearing board 22 may form the body of the dismantling device, the sliding rail 21 and the drive member 23 may form a part of the moving mechanism 30, which may cooperatively work with the first moving mechanism 31 and the second moving mechanism 32 to provide displacements in three directions of degree of freedom, such as a X-direction, a Y-direction, and a Z-direction. The body is configured to support the item to be dismantled, the moving mechanism is arranged on the body and configured to drive the pulling-out assembly to move to the item to be dismantled.

Figure 4:
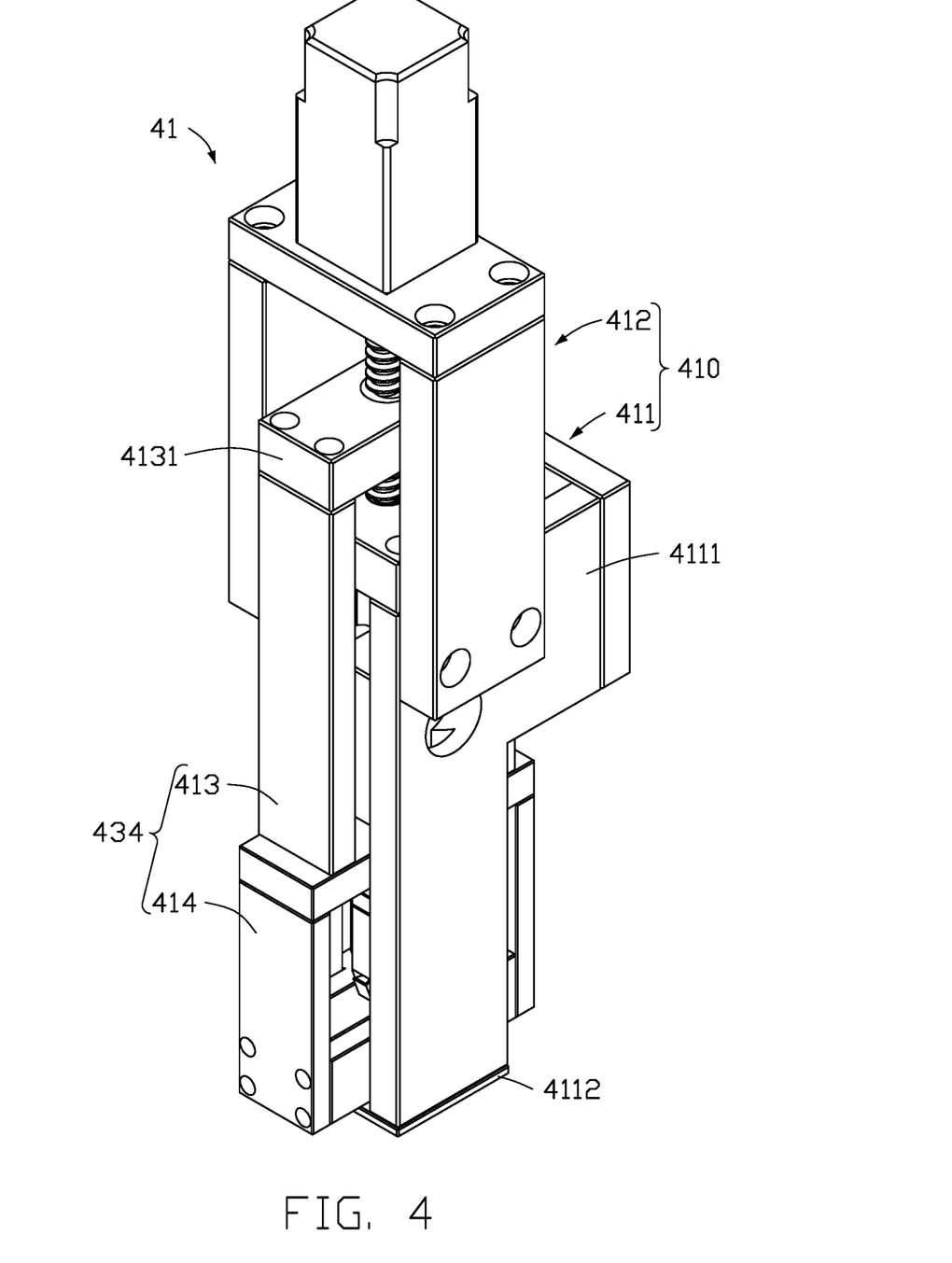
FIG. 4 is a structural schematic diagram of a pulling-out assembly according to the embodiment of the present disclosure.
Figure 5:
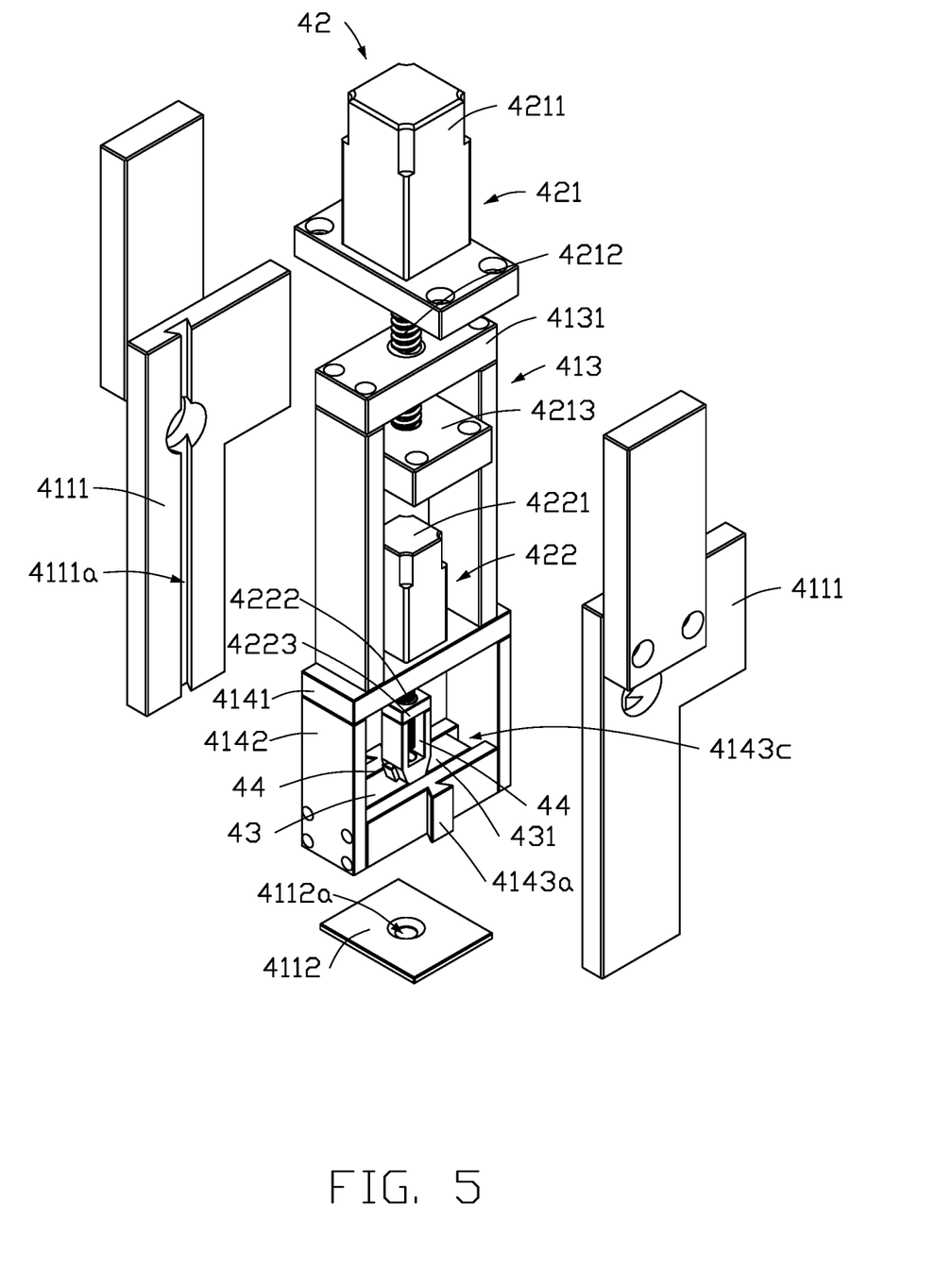
FIG. 5 is an exploded schematic diagram of the pulling-out assembly in FIG. 4.

Referring to FIGS. 4 and 5, the pulling-out assembly 40 includes a connecting mechanism 41, a drive mechanism 42, a catching member 43, and a sliding block 44. The connecting mechanism 41 is connected to the sliding block 323, the drive mechanism 42 is arranged on the connecting mechanism 41, the catching member 43 is arranged on the connecting mechanism 41, the sliding block 44 is connected to the drive mechanism 42.

The connecting mechanism 41 includes an outer framework 410 and an inner framework 434, the inner framework 434 may slide relative to the outer framework 410, the second moving mechanism 32 drives the outer framework 410 to be resisted to the item 200 with an end portion. The inner framework 434 may be driven by the drive mechanism 42 to slide relative to the outer framework 410 to the position of the item 200 to be dismantled. The catching member 43 is slidably arranged on the inner framework 434, the sliding block 44 may be driven by the drive mechanism 42, to drive the catching member 43 to slide on the inner framework 434, so as to catch the part to be dismantled of the item.

In at least one embodiment, the outer framework 410 includes a pressing frame 411 and a securing frame 412. The inner framework 434 includes a first supporting frame 413 and a second supporting frame 414. The pressing frame 411 is connected to the sliding block 323, the securing frame 412 is connected to the pressing frame 411, the first supporting frame 413 and the second supporting frame 414 are connected to the securing frame 412 through the drive mechanism 42.

Figure 6:
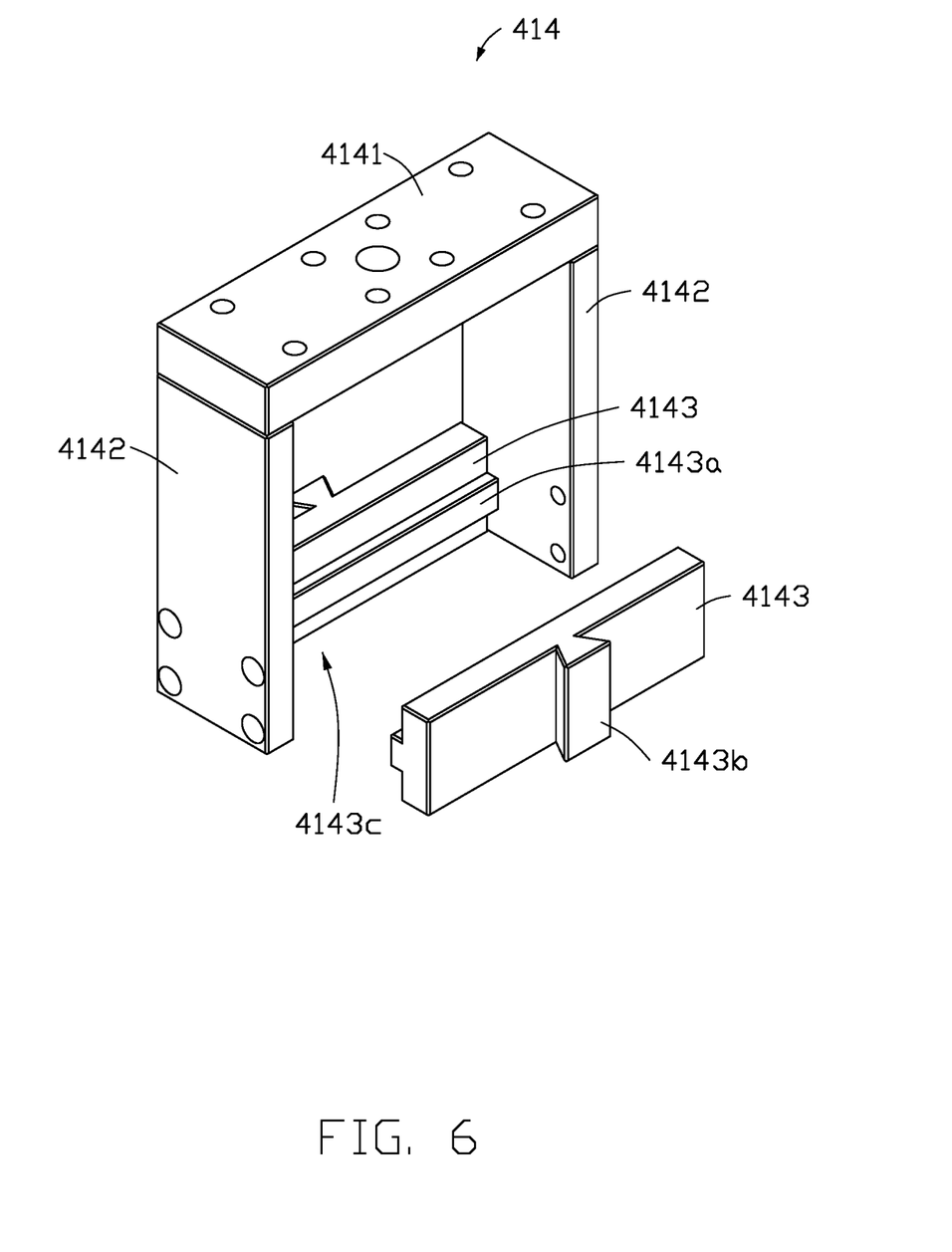
FIG. 6 is a structural schematic diagram of a second support frame according to the embodiment of the present disclosure.

Referring to FIGS. 5 and 6, the pressing frame 411 includes supporting boards 4111 and a pressing board 4112 connected to an end of each supporting boards 4111. Each of the supporting board 4111 is substantially L-shaped, a side of the supporting board 4111 is fixed to the sliding block 323. In at least one embodiment, each supporting board 4111 defines a groove 4111a on an inner sidewall, for slidably connecting the second supporting frame 414. In at least one embodiment, there are two supporting boards 4111 parallel with each other and arranged on two sides of the pressing board 4112. The pressing board 4112 defines a hole 4112a for pressing the item 200 and be inserting with parts of the item 200. The pressing board 4112 may be driven by the second moving mechanism 32 to resist to the item 200, so the parts to be dismantled may exposed from the hole 4112a, and preventing a pulling-out force for dismantling the parts from the item 200 moving the item 200, which may affect the position of the item 200 and the afterwards dismantling. In at least one embodiment, the outer framework 410 including the supporting board 4111 and the pressing board 4112 may be formed by one piece molding.

The securing frame 412 includes a bottom board and two side boards. The two side boards are fixed on the supporting board 4111, the bottom board mounts with the drive mechanism 42. In at least one embodiment, the securing frame 412 is substantially an inverted U-shaped.

A bottom portion of the second supporting frame 414 of the inner framework 434 defines a receiving space 4143c, the catching member 43 is slidably arranged in the receiving space 4143c. The sliding block 44 may be driven by the drive mechanism 42, to drive the catching member 43 to slide in the receiving space 4143c, so as to catch the bolt of the item to be dismantled.

Figure 7:
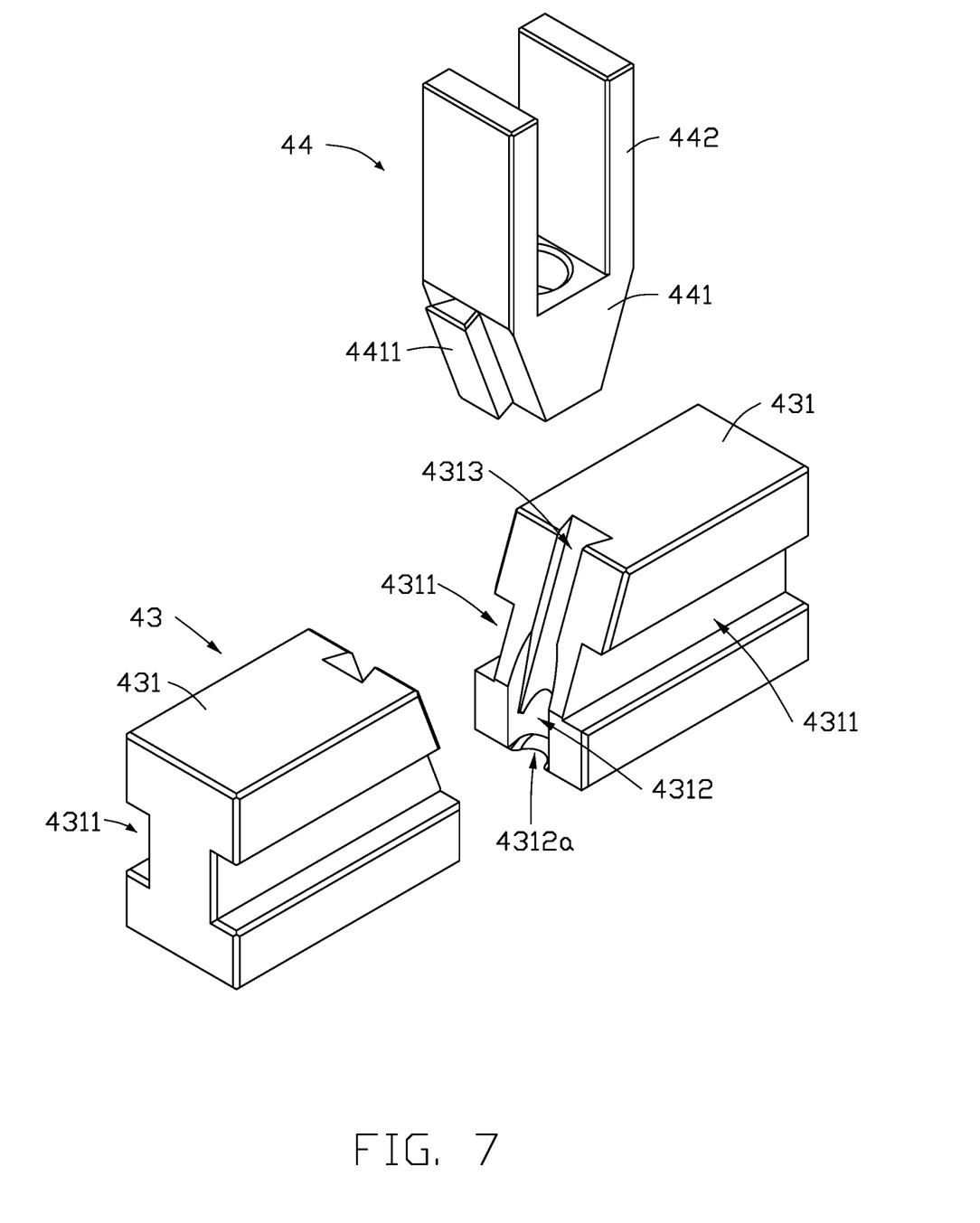
FIG. 7 is a structural schematic diagram of a catching member and a sliding block according to the embodiment of the present disclosure.

In at least one embodiment, the first supporting frame 413 includes a sliding cover board 4131. One end of the first supporting frame 413 is fixed to the second supporting frame 414, another end of the first supporting frame 413 is connected to the drive mechanism 42 through the sliding cover board 4131. Referring to FIG. 7, the second supporting frame 414 includes a holding board 4141, mounting boards 4142, and catching boards 4143. One side of the holding board 4141 is connected to the first supporting frame 413, another side of the holding board 4141 is connected to the mounting boards 4142. In at least one embodiment, there are two mounting boards 4142 parallel with each other, one end of each of the mounting boards 4142 is fixed to the holding board 4141, another end of each of the mounting boards 4142 is connected to the catching boards 4143.

An inner side of each catching board 4143 includes a sliding bar 4143a, an outer side of each catching board 4143 includes a guiding block 4143b. The sliding bar 4143a is arranged along a length direction of the catching board 4143 and slidably connected to the catching member 43. An extended direction of the guiding block 4143b is substantially perpendicular to the sliding bar 4143a, the guiding block 4143b is slidably arranged in the groove 4111a, the guiding block 4143b is configured to engage with the groove 4111a, to ensure a stability of the second supporting frame 414 sliding on the supporting boards 4111. In at least one embodiment, the guiding block 4143b is substantially trapezoid. In at least one embodiment, there are two catching boards 4143 corresponding to each other, the two catching boards 4143 and the holding board 4141 enclose the receiving space 4143c for receiving the catching member 43.

Referring to FIG. 5, the drive mechanism 42 includes a first drive module 421 and a second drive module 422. The first drive module 421 is connected to the securing frame 412 and the sliding cover board 4131, the first drive module 421 is configured to drive the first supporting frame 413 and the second supporting frame 414 to rise and fall relative to the outer framework 410. The second drive module 422 is arranged on the holding board 4141 and connected to the sliding block 44, the second drive module 422 is configured to drive the sliding block 44 to rise and fall relative to the catching member 43, so the catching member 43 may open or close, to catch or release the parts.

The first drive module 421 includes an electric motor 4211, a guide screw 4212, and a limiting portion 4213. The electric motor 4211 is fixed to the securing frame 412 and connected to the guide screw 4212. The guide screw 4212 is connected to the sliding cover board 4131. The limiting portion 4213 is fixed to an end of the guide screw 4212 away from the electric motor 4211, the limiting portion 4213 is configured to prevent the sliding cover board 4131 from separating from the guide screw 4212. The electric motor 4211 rotates the guide screw 4212, so the sliding cover board 4131 may move on the guide screw 4212, the second supporting frame 414 connected to the first supporting frame 413 may move relatively. In at least one embodiment, the electric motor 4211 drives the second supporting frame 414 to move in a direction perpendicular to the plane of the item 200.

The second drive module 422 includes an electric motor 4221, a guide screw 4222, and a sliding block 4223. The electric motor 4221 is fixed to the holding board 4141. One end of the guide screw 4222 inserts through the holding board 4141 and connects the electric motor 4221, another end of the guide screw 4222 extends towards the catching member 43. The sliding block 4223 is arranged on the guide screw 4222 and connected to the sliding block 44. The electric motor 4221 rotates the guide screw 4222, so the sliding block 4223 may move on the guide screw 4222, the sliding block 44 connected to the sliding block 4223 may rise or fall along the extended direction of the guide screw 4222 relative to the catching member 43. An end of the guide screw 4222 away from the electric motor 4221 may include a limiting portion for preventing the sliding block 4223 from separating from the guide screw 4222.

Referring to FIG. 7, the catching member 43 includes catching blocks 431 corresponding to each other, the catching blocks 431 are slidably arranged between two catching boards 4143. In at least one embodiment, opposite sides of each of the catching blocks 431 define sliding grooves 4311 for engaging with the sliding bar 4143*a* of the corresponding catching board 4143, to slidably arranging the catching block 431 on the catching board 4143. When the sliding block 44 pushes the catching blocks 431 downwardly, the corresponding catching blocks 431 are gradually close to or away from each other along the catching boards 4143. In another embodiment, the catching member 43 may be formed by a ring body fixed on the catching boards 4143, one end of the ring body defines a receiving chamber, another end of the ring body includes two elastic portions, the two elastic portions are fit to each other when without external force, inner walls of the two elastic portions define channels, one end of the receiving chamber is aligned with the sliding block 44, another end of the receiving chamber is communicated with the channels, volumes of the channels are decreased along a direction away from the receiving chamber. When the sliding block 44 slidably engages and enters the receiving chamber, along with the sliding block 44 enters the receiving chamber and the channels, the sliding block 44 separates the two elastic portions to let the two elastic portions surround the part, then the sliding block 44 leaves the channels, the two elastic portions resist to and catch the part.

One end of each catching block 431 includes a bevel, the end of each catching block 431 including the bevel is corresponding to each other, and configured to slidably engage with a free end of the sliding block 44, so when the sliding block 44 pushes the catching blocks 431 downwardly, the catching blocks 431 are gradually close to or away from each other. In at least one embodiment, one end of each catching block 431 includes the bevel and an end surface connected to the bevel, the end surface defines a catching groove 4312, the bevel defines a sliding groove 4313, the catching groove 4312 is communicated with the sliding groove 4313. The catching groove 4312 is configured to catch the parts, the sliding groove 4313 is connected to the sliding block 44, through the sliding block 44 pushes the catching blocks 431 to move forward or backward relative to each other on the catching boards 4143, the corresponding catching grooves 4312 may close to or away from each other, so as to catch or release the part. In at least one embodiment, each catching groove 4312 is substantially a semi-column, the sliding groove 4313 is substantially a dovetail groove, one end of the sliding groove 4313 is extended into the catching groove 4312. In at least one embodiment, one end of the catching groove 4312 away from the sliding groove 4313 defines a catching opening 4312*a*, the catching opening 4312*a* is formed by extending from edges of the catching groove 4312 towards an axis direction, the catching opening 4312*a* is substantially wedge-shaped, from high to low inclining from edges of the catching groove 4312 towards the axis direction, for conveniently catching the parts.

In at least one embodiment, the sliding groove 4313 in the catching block 431 may be omitted, an end of the catching block 431 away from the catching groove 4312 includes an elastic piece, the elastic piece is connected between the catching blocks 431 and the mounting boards 4142, the corresponding catching blocks 431 are in an effect of the elastic piece, the end surfaces of the corresponding catching blocks 431 are fit to each other for catching the parts. In another embodiment, the catching blocks 431 include magnetic pieces inside for magnetic adsorbing each other.

Figure 8:
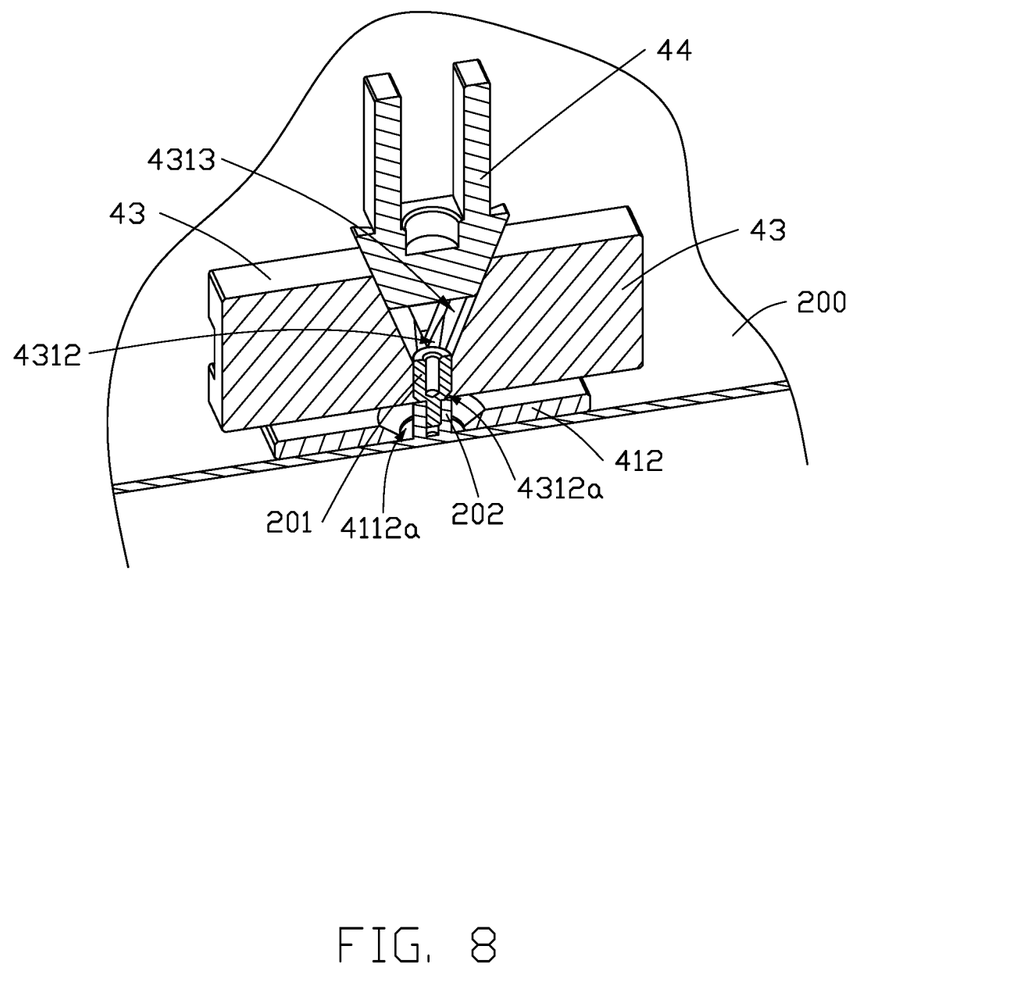
FIG. 8 is a cross-sectional view of the catching member and the sliding block in FIG. 7.

Referring to FIG. 8, through the engagement of the catching blocks 431, the catching openings 4312*a* with wedge-shaped are corresponding to each other and cooperatively support the parts for conveniently pulling out the parts from the item 200.

The sliding block 44 includes a pressing portion 441 and a connecting portion 442. One end of the connecting portion 442 is connected to the sliding block 4223, another end of the connecting portion 442 is connected to the pressing portion 441. Opposite ends of the pressing portion 441 are bevels inclined to each other, which is slidably engaged with the end of the catching block 431 having the bevel, for allowing the sliding block 44 to push the catching blocks 431 to move forward or backward relative to each other.

In at least one embodiment, the pressing portion 441 is substantially inverted square frustum shaped, for separating the fit catching blocks 431. The bevels on two ends of the pressing portion 441 include sliding bars 4411 for slidably engaging with the sliding grooves 4313. In at least one embodiment, the elastic piece and the magnetic piece may be omitted, the sliding bar 4411 is substantially trapezoid for engaging with the sliding groove 4313 in the shape of dovetail groove, through controlling the sliding block 44 to move, the catching blocks 431 may be resisted to or separated from each other. The sliding block 44 is driven by the second drive module 422 to move towards the catching blocks 431, the pressing portion 441 is positioned in the space formed by the corresponding bevels of the catching blocks 431, through the sliding bars 4411 keeping moving to let the pressing portion 441 to slide on the catching blocks 431, the pressing portion 441 separates the fit catching blocks 431, the corresponding catching openings 4312*a* of the catching blocks 431 surround the part, then the sliding block 44 is driven by the second drive module 422 to move backwardly from the catching blocks 431, so the catching blocks 431 may catch the part. After the part is dismantled, the sliding block 44 is driven by the second drive module 422 to move towards the catching blocks 431, the pressing portion 441 separates the fit catching blocks 431, the part may fall. In at least one embodiment, an initial status of the sliding block 44 is slidably connecting to the sliding groove 4313*s* of the catching blocks 431, that is, when the corresponding catching blocks 431 resist to each other, the sliding block 44 is slidably connecting to the sliding groove 4313*s* of the catching blocks 431.

The scanning mechanism 50 is fixed to the second moving mechanism 32 and move together with the second moving mechanism 32, the scanning mechanism 50 is configured to capture the parts to be dismantled. The scanning mechanism 50 is electrically connected to the controller, the controller, based on the positioning information captured by the scanning mechanism 50, controls the bearing mechanism 20, the moving mechanism 30, and the pulling-out assembly 40 to move cooperatively to dismantle the parts from the item. In at least one embodiment, the scanning mechanism 50 may be a charge coupled device (CCD) camera.

Figure 9:
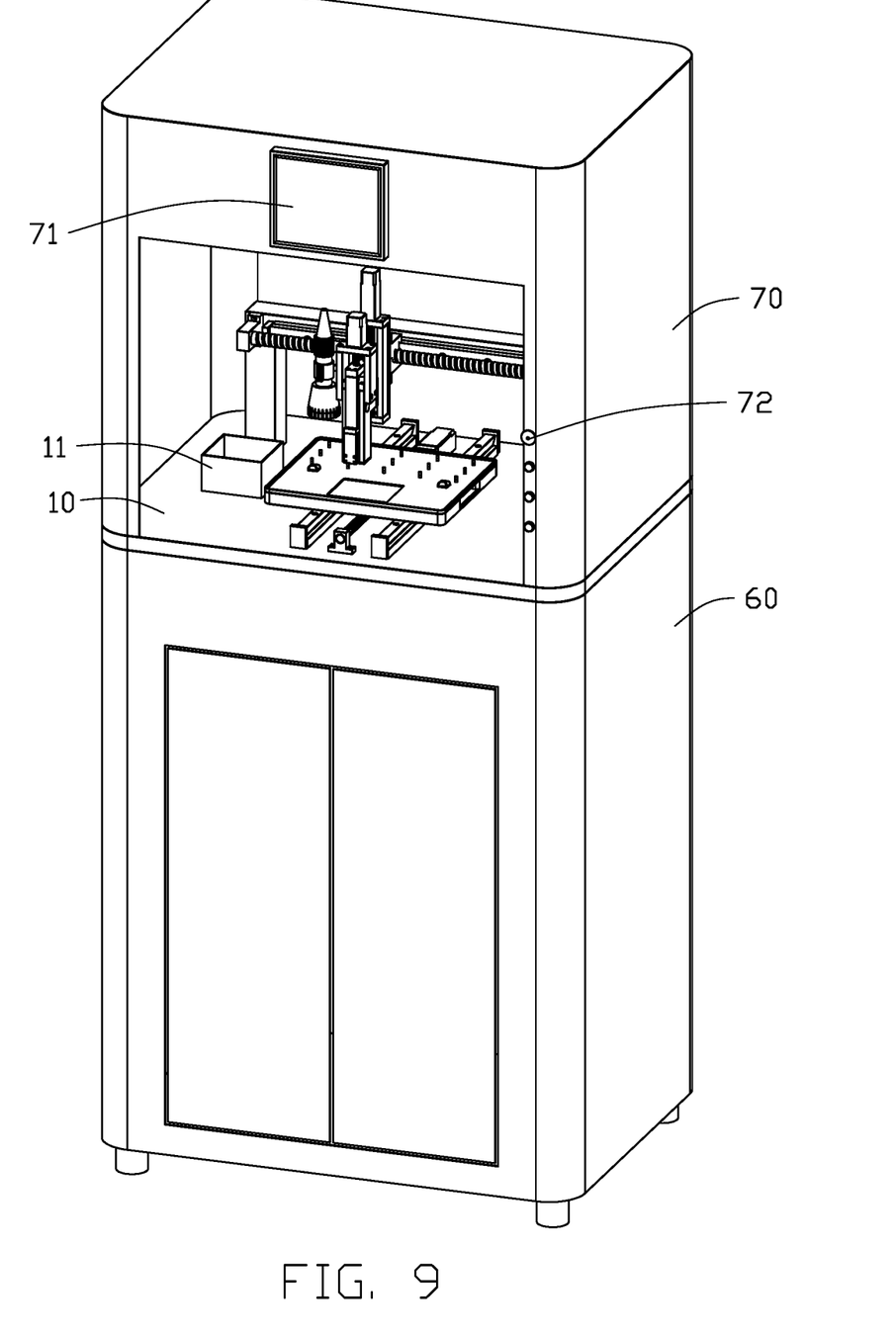
FIG. 9 is a structural schematic diagram of a dismantling device according to another embodiment of the present disclosure.

Referring to FIG. 9, the dismantling device 100 further includes an engine base 60 and a protection cover 70, the protection cover 70 is arranged on the engine base 60. In at least one embodiment, the protection cover 70 includes a human-computer interface 71 and operation buttons 72 for controlling the dismantling device 100.

Referring to FIG. 8, dismantling the screw 201 from the item 200 is set for example, firstly the scanning mechanism 50 captures a part to be dismantled to positioning the part, the controller activates the drive member 23 and the first moving mechanism 31, to control the pulling-out assembly 40 to move to above the screw 201 to be dismantled, the controller controls the second moving mechanism 32 to drive the pulling-out assembly 40 to move towards the screw 201 to be dismantled, the pressing board 4112 of the pressing frame 411 presses the item 200, the screw 201 to be dismantled is exposed from the hole 4112a, the controller activates the first drive module 421 and the second drive module 422, so the second supporting frame 414 moves towards the screw 201 to be dismantled, the sliding block 44 separates the fit catching blocks 431, the corresponding catching openings 4312a of the catching blocks 431 enclose a periphery of the screw 201 to be dismantled, the catching grooves 4312 of the catching blocks 431 surround the screw 201 to be dismantled, the sliding block 44 is driven by the second drive module 422 to backwardly from the screw 201 to be dismantled, the catching blocks 431 move towards each other to catch the screw 201 to be dismantled, the controller activates the first drive module 421, the second supporting frame 414 move away from the screw 201 to be dismantled, to dismantle the screw 201 from the bolt 202, then the first moving mechanism 31 drives the pulling-out assembly 40 to move to above the receiving box 11, through controlling the sliding block 44 to move towards the catching blocks 431, the catching blocks 431 catching the screw 201 separate from each other, the screw 201 falls into the receiving box 11, then a next dismantling process may be operated.

The dismantling device 100 locates the part to be dismantled through the scanning mechanism 50, the controller controls the bearing mechanism 20, the moving mechanism 30, and the pulling-out assembly 40 to move cooperatively to dismantle the parts from the item, no human operations are needed, which is high efficiency, the catching openings with wedge-shaped may conveniently catch the part, which may improve a dismantling yield, decrease damages of the items, and save manufacture cost.

Those skilled in the art should understand that the above description and the embodiments of the present disclosure shown in the drawings are only examples and do not limit the present disclosure. The purpose of the present disclosure has been completely and effectively achieved. The functions and structural principles of the present disclosure have been shown and explained in the embodiments. Without departing from the principles, the implementation of the present disclosure may have any deformation or modification.

What is claimed is:

1. A dismantling device configured to dismantle parts from an item, the dismantling device comprising:
   a base;
   a bearing mechanism arranged on the base, the bearing mechanism being configured to support the item to be dismantled;
   a moving mechanism arranged on the base, the moving mechanism being movable in a first direction and a second direction;
   a pulling-out assembly comprising:
      a connecting mechanism, the connecting mechanism comprising an outer framework and an inner framework, wherein the outer and the inner frameworks are slidable relative to each other, the outer framework is connected to the moving mechanism, the moving mechanism drives the outer framework to press against the item to be dismantled, the inner framework defines a receiving space;
      a drive mechanism connected to the inner framework;
      a catching member slidably arranged in the receiving space; and
   a sliding block connected to the drive mechanism and slidably engaged with the catching member, wherein the drive mechanism drives the inner framework to slide relative to the outer framework until the catching member encloses the parts of the item to be dismantled, the drive mechanism drives the sliding block to move to a position where the catching member is positioned to catch the parts, and the driving mechanism drives the inner framework to move further to dismantle the parts from the item;
   wherein the outer framework comprises a pressing frame, the pressing frame is connected to the moving mechanism, the inner framework comprises a second supporting frame, the pressing frame is slidably connected to the second supporting frame, the pressing frame comprises supporting boards and a pressing board connected to an end of each of the supporting boards, each of the supporting boards defines a groove, the groove is configured to be slidably connected to the second supporting frame, the pressing board defines a hole, the pressing board is configured to press against the item and expose the parts from the hole.

2. The dismantling device according to claim 1, wherein the outer framework comprises a securing frame connected to the pressing frame, the drive mechanism is fixed on the securing frame.

3. The dismantling device according to claim 2, wherein the inner framework comprises a first supporting frame, the first supporting frame is connected to the drive mechanism, the drive mechanism is configured to drive the first supporting frame and the second supporting frame to slide relative to the securing frame and the pressing frame.

4. The dismantling device according to claim 3, wherein the second supporting frame comprises two catching boards corresponding to each other, the two catching boards enclose to cooperatively form the receiving space, an inner side of each of the catching boards comprises a sliding bar, the sliding bar is slidably connected to the catching member, an outer side of each of the catching boards comprises a guiding block, the guiding block is slidably arranged in the groove of one of the supporting board.

5. The dismantling device according to claim 4, wherein the catching member comprises two catching blocks corresponding to each other, opposite sides of each of the of the catching blocks define sliding grooves, the catching blocks are slidably arranged on the catching boards by slidably engaging the sliding bars of the catching boards with a respective one of the sliding grooves.

6. The dismantling device according to claim 5, wherein:
each of the catching blocks comprises elastic pieces connected between the second supporting frame and the catching blocks, the catching blocks resisting each other by an elastic force of the elastic pieces, or
each of the catching blocks comprises magnetic pieces arranged in the catching blocks, the catching blocks resisting each other by a magnetic force of the magnetic pieces.

7. The dismantling device according to claim 5, wherein one end of each of the catching blocks comprises a bevel, the end having the bevel of each of the catching blocks is corresponding to each other, two ends of the sliding block include bevels inclined to each other, slidably engaged with the ends of the catching blocks having the bevel, thereby the sliding block pushes the catching blocks to move forward or backward relative to each other.

8. The dismantling device according to claim 7, wherein each of the catching blocks defines a sliding groove and a catching groove communicated with the sliding groove, the sliding groove is defined on the bevel of the catching blocks, as the sliding block pushes the catching blocks to move forward or backward relative to each other on the catching boards, the catching grooves of the catching blocks are moved closer or away from each other.

9. The dismantling device according to claim 7, wherein two ends of the sliding block comprise sliding bars, an end of the sliding block pushing the catching blocks is an inverted square frustum shaped structure, the sliding bars are arranged on two sides of the inverted square frustum shaped structure for slidably engaging with the sliding grooves.

10. The dismantling device according to claim 5, wherein the drive mechanism comprises a first drive module and a second drive module, the first drive module is connected to the securing frame and the first supporting frame, the first drive module is configured to drive the first supporting frame and the second supporting frame to rise and fall relative to the securing frame; the second drive module is arranged on the second supporting frame and connected to the sliding block, the second drive module is configured to drive the sliding block to rise and fall relative to the catching blocks, thereby moving the catching blocks become closes or away from each other.

11. A dismantling device configured to dismantle parts from an item, the dismantling device comprising: a body, a moving mechanism, and a pulling-out assembly, the body being supporting the item to be dismantled; the moving mechanism being arranged on the body, the moving mechanism being configured to drive the pulling-out assembly to move to the item to be dismantled;
the pulling-out assembly comprising:
a connecting mechanism connected to the moving mechanism, the moving mechanism being configured to drive the connecting mechanism to press against the item to be dismantled;
a drive mechanism comprising a first drive module and a second drive module;
a catching member slidably arranged on the connecting mechanism; and
a sliding block connected to the second drive module and slidably engaged with the catching member, wherein the second drive module is configured to drive the sliding block to move relative to the catching member, the catching member selectively catches the parts of the item, the first drive module is configured to drive the connecting mechanism, the catching member moves backwardly to dismantle the parts from the item;
wherein the connecting mechanism comprises an outer framework and an inner framework, the outer and the inner frameworks are slidable relative to each other, the moving mechanism drives the outer framework to press against the item to be dismantled, the inner framework defines a receiving space, the catching member is slidably arranged in the receiving space, the pressing frame comprises supporting boards and a pressing board connected to an end of each of the supporting boards, each of the supporting boards defines a groove, the groove is configured to be slidably connected to the second supporting frame, the pressing board defines a hole, the pressing board is configured to press against the item and expose the parts from the hole.

12. The dismantling device according to claim 11, wherein the inner framework comprises a first supporting frame and a second supporting frame, the first supporting frame is connected to the drive mechanism, the pressing frame is slidably connected to the second supporting frame, the drive mechanism is configured to drive the first supporting frame and the second supporting frame to slide relative to the securing frame and the pressing frame.

13. The dismantling device according to claim 12, wherein the second supporting frame comprises two catching boards corresponding to each other, the two catching boards enclose to cooperatively form the receiving space, an inner side of each of the catching boards comprises a sliding bar, the sliding bar is slidably connected to the catching member, an outer side of each of the catching boards comprises a guiding block, the guiding block is slidably arranged in the groove of one of the supporting board.

14. The dismantling device according to claim 13, wherein the catching member comprise catching blocks corresponding to each other, one end of each of the catching blocks comprises a bevel, the end having the bevel of each of the catching blocks is corresponding to each other, opposite ends of the sliding block include bevels inclined to each other, slidably engaged with the ends of the catching blocks having the bevel, for allowing the sliding block to push the catching blocks to forwardly to or backwardly from each other.

15. The dismantling device according to claim 14, wherein each of the catching blocks defines a sliding groove and a catching groove communicated with the sliding groove, the sliding groove is defined on the bevel of the catching blocks, as the sliding block pushes the catching blocks to move forward or backward relative to each other on the catching boards, the catching grooves of the catching blocks are moved closer or away from each other.

16. The dismantling device according to claim 15, wherein two ends of the sliding block comprise sliding bars, an end of the sliding block pushing the catching blocks is an inverted square frustum shaped structure, the sliding bars are arranged on two sides of the inverted square frustum shaped structure for slidably engaging with the sliding grooves.

17. The dismantling device according to claim 14, wherein the drive mechanism comprises a first drive module and a second drive module, the first drive module is connected to the securing frame and the first supporting frame, the first drive module is configured to drive the first supporting frame and the second supporting frame to rise and fall relative to the securing frame; the second drive module is arranged on the second supporting frame and connected to the sliding block, the second drive module is configured to drive the sliding block to rise and fall relative to the catching blocks, thereby moving the catching blocks become closes or away from each other.

* * * * *